United States Patent
Shi et al.

(10) Patent No.: US 9,531,999 B2
(45) Date of Patent: Dec. 27, 2016

(54) REAL-TIME SMART DISPLAY DETECTION SYSTEM

(71) Applicants: Shu Shi, Menlo Park, CA (US); John Barrus, Menlo Park, CA (US)

(72) Inventors: Shu Shi, Menlo Park, CA (US); John Barrus, Menlo Park, CA (US)

(73) Assignee: RICOH CO., LTD., Tokyo (JP)

( * ) Notice: Subject to any disclaimer, the term of this patent is extended or adjusted under 35 U.S.C. 154(b) by 0 days.

(21) Appl. No.: 14/546,994

(22) Filed: Nov. 18, 2014

(65) Prior Publication Data

US 2015/0296180 A1     Oct. 15, 2015

Related U.S. Application Data

(60) Provisional application No. 61/979,450, filed on Apr. 14, 2014.

(51) Int. Cl.
  *H04N 7/14*     (2006.01)
  *H04N 7/15*     (2006.01)
  *G06K 9/00*     (2006.01)

(52) U.S. Cl.
  CPC ............ *H04N 7/15* (2013.01); *G06K 9/00758* (2013.01); *H04N 7/147* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,953,506 A | * | 9/1999 | Kalra | G06T 3/4092 345/428 |
| 7,796,190 B2 | * | 9/2010 | Basso | H04N 21/2389 348/445 |
| 8,311,513 B1 | * | 11/2012 | Nasserbakht | G06Q 10/109 455/410 |
| 8,995,716 B1 | * | 3/2015 | Zomet | G06K 9/00664 382/103 |
| 2010/0103241 A1 | * | 4/2010 | Linaker | G06Q 30/06 348/14.02 |

(Continued)

OTHER PUBLICATIONS

V. Chandrasekhar et al., Compressed Histogram of Gradients: A Low-Bitrate Descriptor, dated Sep. 27, 2010, Springer Science + Business Media, LLC 2011, 16 pages.

(Continued)

*Primary Examiner* — Duc Nguyen
*Assistant Examiner* — Assad Mohammed
(74) *Attorney, Agent, or Firm* — Patent Law Works LLP

(57) ABSTRACT

A smart display detection system is disclosed. The smart display system is configured to allow mobile users to connect with display screens through mobile device cameras. The system can detect the display screens within images captured by the mobile device camera in real time by matching the camera query image with screen images dynamically updated from the display devices. A synchronized time-stamped matching strategy is applied to achieve high performance in detecting the screens playing motion intensive video contents and an aggressive feature selection method is applied to minimize the system uploading bandwidth. The system can accurately find display screens playing either static or dynamic content within an image captured on a mobile device.

20 Claims, 7 Drawing Sheets

(56) References Cited

U.S. PATENT DOCUMENTS

2011/0311095 A1* 12/2011 Archer .............. G06K 9/00744
                                                382/100
2014/0003656 A1* 1/2014 Lin .................... G06K 9/3241
                                                382/103
2014/0020005 A1   1/2014 Amselem et al.

OTHER PUBLICATIONS

David Chen et al., Dynamic Selection of a Feature-Rich Query Frame for Mobile Video Retrieval, dated 2010, Information Systems Laboratory, Stanford, CA, 4 pages.
Xi Chen and Markus Koskela, "Mobile Visual Search from Dynamic Image Databases", dated 2011, Department of Information and Computer Science Aalto University School of Science, Espoo, Finland, 10 pages.
Berna Erol et al. "Retrieval of Presentation Recordings with Digital Camera Images", dated 2014, Ricoh Innovations Inc., California Research Center, Menlo Park, CA, 2 pages.
Martin A Fischler and Robert C Bolles, A Paradigm for Model Fitting with Applications to Image Analysis and Automated Cartography, dated Mar. 1980, Artificial Intelligence Center SRI International, Menlo Park, CA, 42 pages.
J Garrett-Glaser "The Best Low-Latency Video Streaming Platform in the World", dated Jan. 2010, Jason Garret-Glaser, 17 pages.
B Girod, et al., "Mobile Visual Search" dated 2011, IEEE Signal Processing Magazine, Special Issue on Mobile Search, 11 pages.
Google Forum, "Search for Pictures with Google Goggles" Google, dated 2009, 2 pages.
David G Lowe, "Distinctive Image Features from Scale-Invariant Keypoints" dated 2004, International Journal of Computer Vision 60(2), Kluwer Academic Publishers, Manufactured in the The Netherlands, 20 pages.
D L Mills, "Simple Network Time Protocol" dated Jan. 2006, The Internet Society, 27 pages.
RICOH "Superior Visual Search Platform" http://www.occutag.com/, dated 2012, 4 pages.
C Silpa-Anan and R Hartley, "Optimised KD-Trees for Fast Image Descriptor Matching", dated 2008, CVPR 2008, IEEE Conference, 8 pages.
Grace Woo et al., "VRCodes: Unobtrusive and Active Visual Codes for Interaction by Exploiting Rolling Shutter" dated 2012, 2012 IEEE International Symposium, 6 pages.

* cited by examiner

REAL-TIME SMART DISPLAY DETECTION SYSTEM

CROSS REFERENCE TO RELATED APPLICATIONS

The present application claims priority, under 35 U.S.C. §119, of U.S. Provisional Patent Application No. 61/979,450, filed Apr. 14, 2014 and entitled "A Real-Time Smart Display Detection System," which is incorporated by reference in its entirety.

BACKGROUND

1. Field of the Art

The techniques and hardware arrangements described herein relate to a display detection system. In particular, the display detection system allows users of mobile devices to detect a display screen by capturing images of the display screen and view what is being displayed on the display screen on the mobile device.

2. Description of the Related Art

The mobile cameras equipped on most modern smartphones are increasingly used as a gateway for accessing information. For example, many smartphone applications use mobile cameras to scan Barcodes or QR codes. Several image visual search systems (e.g., Google Goggles™, Ricoh Occutag™, etc.) have been developed for landmark recognition and product recognition based on the images captured by mobile cameras.

There have been several related systems proposed in the literature. VR Code displays on the screen patterned information that is invisible to human but visible to special cameras so that the mobile device can recognize which screen it is looking at. Another system allows a user to retrieve presentation slides with camera captured images. TvTak is a mobile app that can recognize which TV program is shown by snapping a photo of the TV screen. According to the publicly available technical documents, the app tries to recognize one TV screen within the captured image based on the screen position and aspect ratio information, extracts the image/video fingerprints, and searches for the best match in the TV program database. Some mobile video retrieval systems can also support video search by snapping a photo of the video screen but the video database must be preprocessed before the search can be performed.

Additionally, existing videoconferencing systems collect and transmit data streams along with video and audio streams in a videoconference session. This is because in most business meetings, the users expect to not only see each other, but also to exchange data information, such as documents, presentation slides, handwritten comments, etc. These data streams are usually directly captured from computer screens, separately encoded with special coding tools, and displayed side-by-side with the video streams on a remote site.

The explosion of mobile devices drives more and more videoconferencing service providers to develop mobile applications such as smart phone and tablet applications. These mobile applications make it much easier for the users to access the videoconferencing service from anywhere using mobile devices.

BRIEF DESCRIPTION OF THE DRAWINGS

Embodiments of the disclosure are illustrated by way of example, and not by way of limitation in the figures of the accompanying drawings in which like reference numerals are used to refer to similar elements.

DETAILED DESCRIPTION

The techniques and hardware arrangements introduced herein provide a display detection system that can automatically detect the data screens of display devices within an image captured by a mobile device so that a data stream being displayed by the display device may be transmitted to and displayed by a display of the mobile device.

The techniques introduced herein provide advantages over existing techniques and systems for hosting multi-participant meetings. For example, participants sitting in the back of a large room where a multi-participant meeting is taking place usually cannot see all of the small text details on a data screen. Moreover, the participants may not finish reading the current slide before the speaker moves to the next page. Using the techniques and hardware arrangements introduced herein, the user can capture an image of the data screen with a mobile device and receive the data stream being presented by the display device to access current and past slide images in high quality on the mobile device. In another example, a user wants to know more information about a product being advertised in a commercial video playing on a display device. Using the techniques introduced herein, producers of such commercial videos may provide this additional information to a user by registering the display device and providing the details to an image query including an image of the commercial video being displayed by the display device. With one click, the display detection system can find the screen and redirect the mobile device to the full version of the commercial video or a web page for the advertised product.

As described in more detail below, the techniques introduced herein apply a content-based approach. The techniques include comparing local features of the image captured by the mobile device camera and a series of screen images of the display device that are dynamically updated to find the best match. In particular, the system uses synchronized time-stamped matching to enhance the detection accuracy for display devices presenting motion intensive video and reduce the display bandwidth usage by uploading only selected feature points. This is particularly advantageous in numerous respects. For example, the disclosed system (a) does not require special display or camera devices; (b) can detect a display device playing live video contents; (c) can detect multiple display devices within a single image captured by a mobile device camera or a videoconferencing camera; and (d) functions even if only a partial display device is captured in the image.

Figure 1:
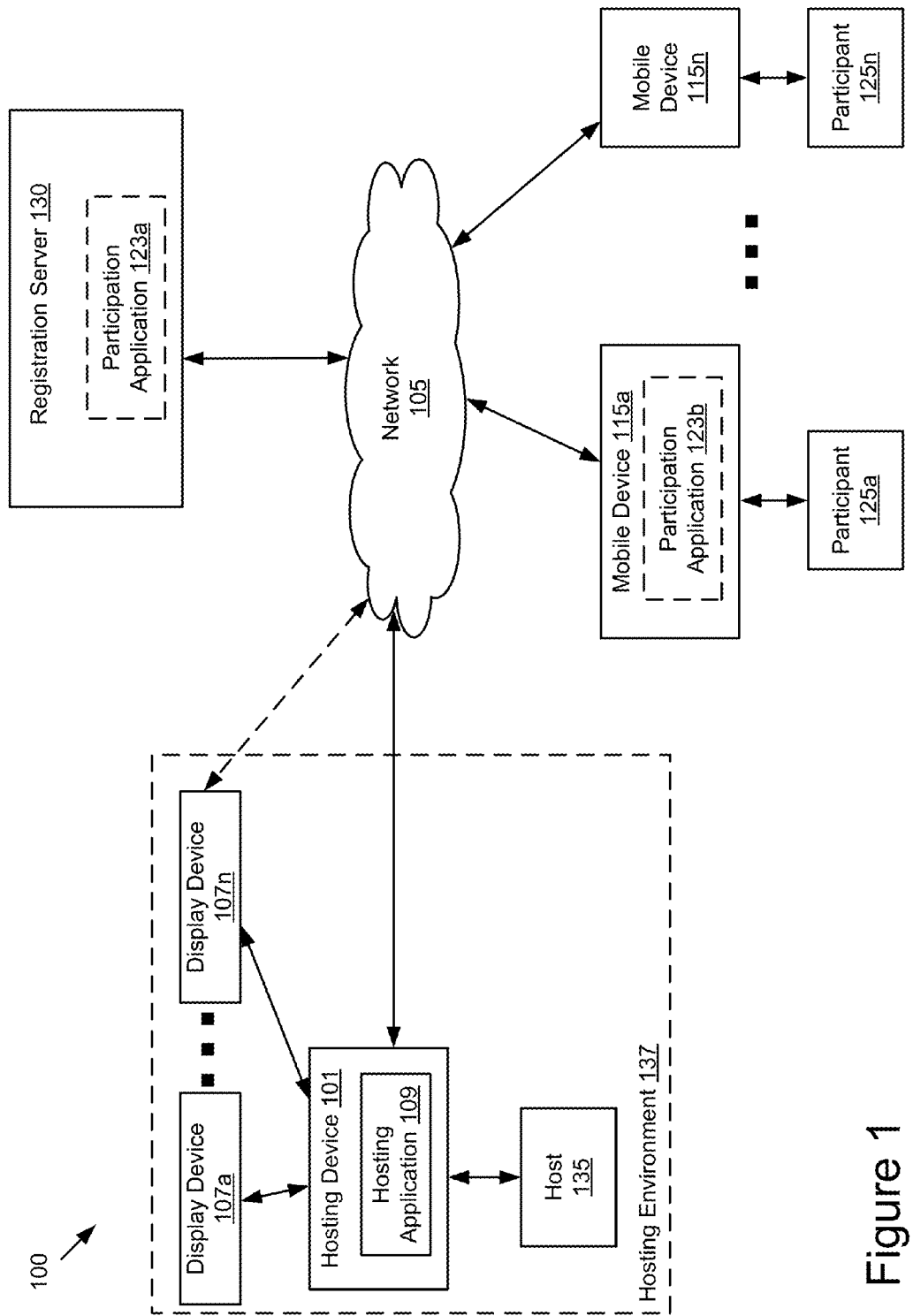
FIG. 1 is a high-level block diagram illustrating one embodiment of a system for connecting with a display through a mobile device.

FIG. 1 is a high-level block diagram illustrating one embodiment of a system 100 for connecting with a display through a mobile device. The illustrated system 100 includes a hosting device 101 accessible by a host 135, a registration server 130, display devices 107a . . . 107n and mobile devices 115a . . . 115n accessible by participants 125a . . . 125n. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupling the mobile devices 115, the hosting device 101 and the registration server 130, in practice one or more networks 105 can connect these entities.

A hosting environment 137 is an environment in which a multi-participant meeting is hosted. For example, the hosting environment may be a conference room or other meeting room where several individual participants 125 are present to participate in the meeting. In another example, the multi-participant meeting may be a videoconferencing meeting where some or all of the participants 125 are at a location that is remote from the hosting environment 137 and connect to the meeting through the network 105. As depicted in the example of FIG. 1, the hosting environment 137 could be a conference room environment including the hosting device 101 and one or more display devices 107 present in the conference room. Example display devices 107 include, but are not limited to, a projector, an electronic whiteboard, a liquid-crystal display and any other conventional display devices. Although two display devices 107 are illustrated in the example of FIG. 1, the hosting environment 137 can include one or more display devices 107.

The hosting device 101 is a computing device including a processor and a memory, and is coupled to the network 105. For example, the hosting device 101 may be a hardware server, a laptop computer, a desktop computer, or the like. The hosting device 101 is accessed by a host 135, for example, a user that manages a meeting. The hosting device 101 includes a hosting application 109 and a storage device for storing the materials presented using the hosting application 109. The hosting device 101 is communicatively coupled to the display device 107.

The hosting application 109 is software and/or logic executed by the hosting device 101 for hosting a multi-participant meeting. For example, the hosting application 109 hosts a meeting that the host 135 manages and one or more participants 125 using one or more mobile devices 115 join in. Additionally, the hosting application 109 coordinates presentation of meeting materials on the display 107. For example, the hosting application 109 coordinates presentation of a data screen to be displayed to participants 125 on one or more of the display devices 107 in the hosting environment 137. The data screen to be shared with participants 125 may be, but is not limited to, a text-based document, web page content, presentation slides, video clips, stroke-based handwritten comments and/or other user annotations, etc.

In one embodiment, the hosting application 109 captures a high quality version of a data stream displayed by the display device 107. This high quality version of the data stream displayed by the display device 107 includes a series of data screen images (e.g., screenshot images) depicting content displayed on the display device 107 over time. At different moments of time, different screenshot images of the content displayed on the display device 107 are captured. For example, the hosting application 109 may capture a series of screenshot images of a slide presentation in high resolution. In another example, an electronic whiteboard may capture original stroke information displayed on the whiteboard screen, and sends screenshot images depicting the original stroke information to the hosting application 109. In one embodiment, the hosting application 109 sends the data stream associated with the data screen to the registration server 130 and or the mobile device 115. In another embodiment, the display device 107 directly sends the data stream including one or more data screen images to one or more of the mobile device 115 and the registration server 130.

The registration server 130 includes a processor and a memory and is coupled with the network 105 to communicate with other entities in system 100. The registration server 130 also includes a database for storing the one or more images received from the hosting application 109 and/or the display device 107. The registration server 130 registers a display device 107 for a multi-participant meeting and associates the one or more received images from the hosting application 109 or the display device 107 with the registered display device 107. The registration server 130 includes software and/or logic to match a data screen depicted in an image received from a camera of a mobile device 115 or a video conferencing camera (not shown) to a registered image, return an indication that the data screen corresponds to a data stream associated with a display device 107, and connect the mobile device 115 to the data stream for display to the user of the mobile device. As depicted in the example of FIG. 1, the registration server may optionally be coupled with a display device 107 via the network 105 or a direct communication link (not shown). The registration server 130 is described in more detail below with reference to FIGS. 2 and 3.

The mobile devices 115a . . . 115n is a mobile computing device that includes a memory, a processor, and a display. For example, a mobile device 115 may be a laptop computer, a tablet computer, a mobile telephone, a smartphone, a personal digital assistant (PDA), a mobile email device, or other electronic device capable of accessing the network 105. In some embodiments, the mobile device 115 includes a touch screen for displaying data and receiving gesture input from a participant 125. Gesture input may include, but is not limited to a tap, double tap, long press, scroll, pan, flick, two finger tap, pinch open, pinch close, etc. As depicted in the example of FIG. 1, the mobile devices 115 are communicatively coupled to the network 105. Thus, a participant 125 can be a remote user participating in a multi-participant meeting such as a videoconferencing session hosted by the hosting device 101. While FIG. 1 illustrates two mobile devices 115a and 115n, the techniques introduced herein apply to a system architecture having one or more mobile devices 115.

In some embodiments, a mobile device 115 may be configured to run all or part of the participation application 123. For example, in one embodiment, the participation application 123b acts as a thin-client application with some functionality executed on the mobile device 115 and additional functionality executed on the registration server 130 by participation application 123a. For example, the participation application 123b on the mobile device 115a could include software or routines for capturing an image with a camera of the mobile device and sending the image to the registration server for identification of a data screen in the image. Further, the participation application 123b may allow the participant 125a to interact with an indication of a data stream associated with a data screen and, in response, display the data stream on a display of the mobile device 115a. A thin-client application 123b may include other functionality of the participation application 123 as described below.

The participation application 123 includes software code or routines providing functionality and an interface for a participant 125 to participate in a multi-participant meeting. In some embodiments, the participant application 123 can be implemented using programmable or specialized hardware, such as a field-programmable gate array (FPGA) or an application-specific integrated circuit (ASIC). In some other embodiments, the participant application 123 can be implemented using a combination of hardware and software. In other embodiments, the participant application 123 may be stored and executed by a combination of the mobile devices 115 and the registration server 130, or by any one of the mobile devices 115 or registration server 130.

Figure 2:
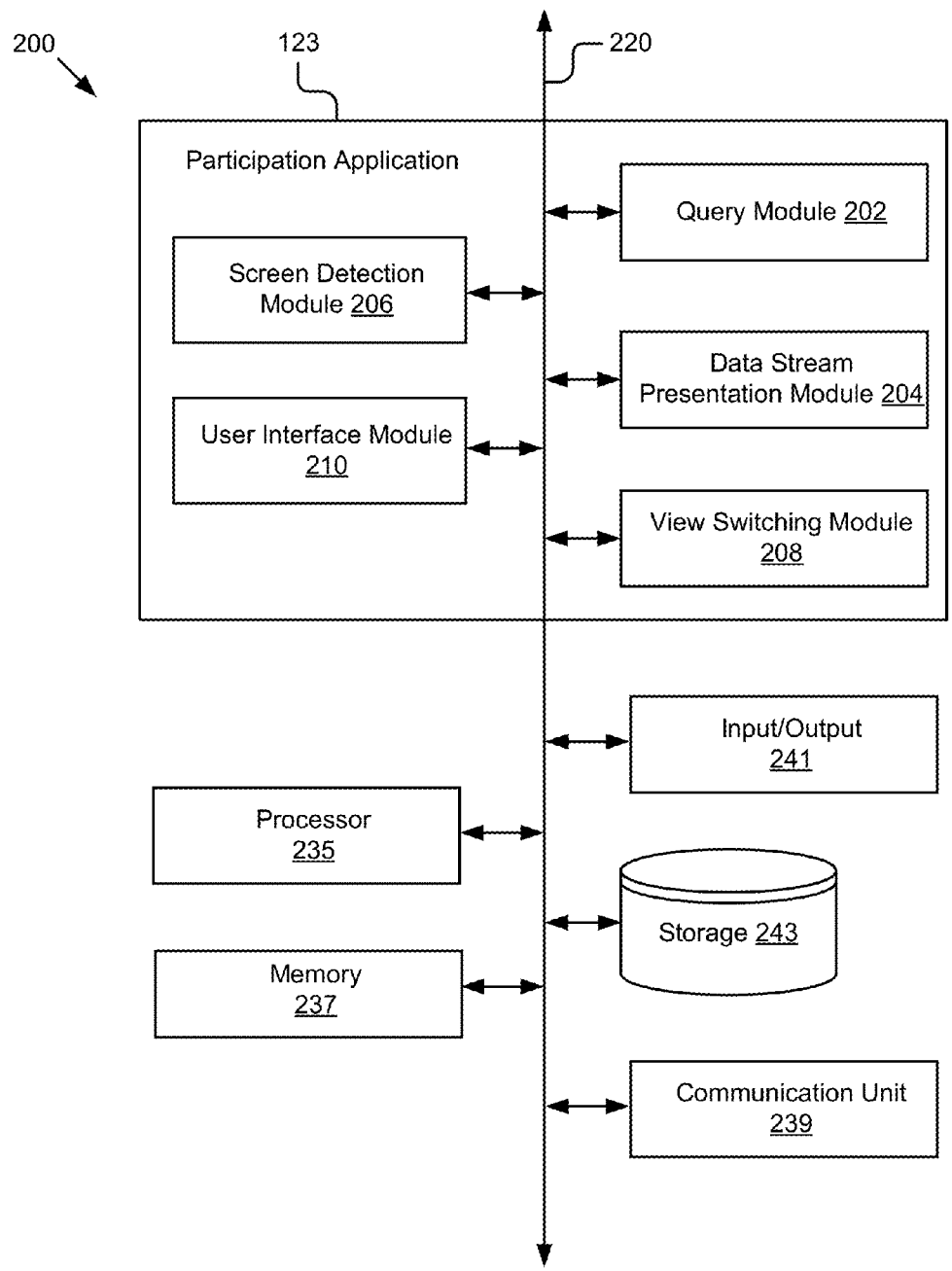
FIG. 2 is a block diagram illustrating one embodiment of a participation application.

Referring now to FIG. 2, an example of the participation application 123 is shown in more detail. FIG. 2 is a block diagram of an example computing device 200 that includes a participation application 123, a processor 235, a memory 237, an input/output device 241, a communication unit 239, and a storage device 243. The components of the computing device 200 are communicatively coupled by a bus 220. In various embodiments, the computing device 200 can be a mobile device 115 or a registration server 130 as described above.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, a Graphics Processing Unit (GPU), and/or an architecture implementing a combination of instruction sets. The processor 235 may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing system 200.

The memory 237 may store and provide access to data for the other components of the computing system 200. In some implementations, the memory 237 may store instructions and/or data that may be executed by the processor 235. For example, in one embodiment, the memory 237 may store instructions, which when executed by the processor, causes the processor to implement the participation application 123. The memory 237 may also be capable of storing other instructions and data, including, for example, an operating system, hardware drivers, other software applications, databases, etc. The memory 237 may be coupled to the bus 220 for communication with the processor 235 and the other components of the computing system 200.

The memory 237 may include one or more non-transitory computer-usable (e.g., readable, writeable, etc.) mediums, which can be any tangible apparatus or device that can contain or store instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk, an optical disk (CD, DVD, Blue-ray™, etc.). It should be understood that the memory 237 may be a single device or may include multiple types of devices and configurations.

The communication unit 239 is hardware for receiving and transmitting data by coupling the processor 235 and other components of the computing system 200 to the network 105 and other processing systems. In one embodiment, the communication unit 241 may include a port for direct physical connection to the network 105 or to another communication channel. For example, the communication unit 239 may include an RJ45 port or similar port for wired communication with the network 105. In another embodiment, the communication unit 239 may include a wireless transceiver (not shown) for exchanging data via the network 105 or any other communication channel using one or more wireless communication methods, such as IEEE 802.11, IEEE 802.16, Bluetooth® or another suitable wireless communication method.

In yet another embodiment, the communication unit 239 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 239 may include a wired port and a wireless transceiver. The communication unit 239 also provides other conventional connections to the network 105 for distribution of files and/or media objects using standard network protocols such as TCP/IP, HTTP, HTTPS and SMTP.

The storage device 243 can be a non-transitory memory that stores data for providing the functionality described herein. The storage device 243 may be a dynamic random access memory (DRAM) device, a static random access memory (SRAM) device, flash memory or some other memory devices. In some embodiments, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 243 is communicatively coupled to the bus 220. In one embodiment, the storage device 243 stores the data stream including one or more data screen images. The storage device 243 may store other data for providing the functionality described herein. For example, the storage device 243 could store copies of video conferencing materials, such as presentations, documents, audio clips, video clips, etc.

In the illustrated embodiment shown in FIG. 2, the participation application 123 includes a query module 202, a data stream presentation module 204, a screen detection module 206, a view switching module 208, and a user interface module 210. The components of the participation application 123 are communicatively coupled via the bus 220. As described above, the components of the participation application can be stored and executed in part on the mobile device 115 and in part on the registration server 130. For example, a participation application 123 stored and executed on the registration server 130 could include the screen detection module 206 and a participation application 123 stored on the mobile device 115 could include the remaining components described in the example of FIG. 2.

The query module 202 includes software and/or logic to capture an image and generate an image query. In one embodiment, the query module 202 can be a set of instructions executable by the processor 235 to provide the functionality described below for generating an image query using a camera on a mobile device 115. The query module 202, as discussed in more detail below, accesses the camera of the mobile device 115, initiates the capture of one or more images, collects information relating to the image capture (e.g., location and time-stamp data), and sends the image query to the screen detection module 206. In one embodiment, the query module 202, instead of receiving an image from the camera of the mobile device, receives a video feed of the hosting environment 137 that includes one or more display devices 107 via a videoconferencing application run by the participation application 123. The query module 206 may similarly determine a location of the video feed and send an image query including an image from the video stream and related information to the screen detection module 206. For example, if the screen detection module 206 receives a photo of a local display showing a video conference of a remote location, the data stream from the local display indicates the source location (i.e., the remote location—specified as GPS coordinates, IP address, or other location information) of the video conference. Using this location information, the query module 202 can run a second query on the original image but include displays being shown in the video conference of the remote location. As a result, the screen detection module 206 can use the location of the local display and the location of the video conference to return a data stream for each of the detected displays as discussed elsewhere herein.

The data stream presentation module 204 includes software and/or logic to present a data stream on a mobile device 115. In one embodiment, the data stream presentation module 204 can be a set of instructions executable by the processor 235 to provide the functionality described below for presenting a data stream on a mobile device 115. The data stream presentation module accesses a data stream provided by the hosting application 109 and/or a display device 107 and provides the data stream on a display of the mobile device 115. This is beneficial to a participant in the multi-participant meeting, for example, when a participant is far from the data screen presented by the display device 107 and the data screen is not clear to the user. In this scenario, the data stream may be clearly presented to the participant on a display of the mobile device 115.

In one embodiment, the data stream presentation module 204 receives an identifier of a detected data screen, from the screen detection module 206, and a selection of the detected data screen, from the user interface module 210. In response to receiving the selection of the detected data screen, the data stream presentation module 204 presents a data stream corresponding to the selected data screen for display on the mobile device 115. In some embodiments, the data stream presentation module 204 receives a data stream associated with the selected data screen directly from the display device 107 associated with the data screen. In some other embodiments, the data stream presentation module 204 receives the data stream from the hosting application 109 via the hosting device 101.

In some examples, a secondary data stream is associated with the data stream. For example, the data stream from the hosting application 109 may be a video clip of a video conference where slides are being presented. The secondary data stream, in this example, would be the slides being presented to participants of the video conference and visible to a remote user in the video clip. The data stream presentation module 204 receives, from the user interface module 210, a selection of the secondary data stream instructing the data stream presentation module 204 to switch the view on the mobile device 115 to the secondary data stream. The mobile device 115 displays the secondary data stream to the participant 125 in full resolution or in full screen so that it is easy for the participant to view the secondary data stream. A secondary data stream can be a videoconferencing meeting, a presentation, a video clip, a text document, presentation slides, or other types of data associated with the data stream.

The screen detection module 206 includes software and/or logic to perform data screen detection on an image received from the mobile device 115. In some embodiments, the screen detection module 206 may be implemented using programmable or specialized hardware including a field-programmable gate array (FPGA) or an application-specific integrated circuit (ASIC). In some embodiments, screen detection module 206 may be implemented using a combination of hardware and software executable by processor 235. In other embodiments, the screen detection module 206 is a set of instructions executable by the processor 235. In some implementations, the screen detection module 206 is instructions stored in the memory 237 and is accessible and executable by the processor 235. In some implementations, the screen detection module 206 is adapted for cooperation and communication with the processor 235, the memory 237 and other components of the computing system 200 via the bus 220.

In one embodiment, the screen detection module 206 registers one or more display devices 107 with the registration server 130. For example, the screen detection module 206 can record a display device identifier, a user associated with the display device 107, and the like, and store the registration information in the storage 243. The screen detection module 206 also receives a series of screen images corresponding to each data screen displayed by a display device 107. In one embodiment, each display device 107 can send a series of screen images of the data screen being displayed to the registration server 130. For example, each display device 107 sends its up-to-date screenshot image to the registration server 130 periodically. In some examples, the display device 107 sends the updated screenshot images of its data screen to the registration server 130 via the hosting device 101.

As the series of screen images are received, the screen detection module 206 organizes the screen images from all of the registered displays devices into a dynamically constructed search database stored in the storage 243. One particular advantage to previously known visual search systems is that the search database is dynamically updated based on the series of screen images received by the screen detection module 206 for each display device registered with the screen detection module 206. Depending on how frequently the data screen changes, there can be multiple screen updates every second, which makes any time consuming indexing methods (e.g., vocabulary tree and inverted index) impractical to create a dynamically constructed search database. The screen detection module 206 therefore uses a multiple randomized k-d trees approach. The screen detection module 206 builds a randomized k-d tree for every screen image received in the series of screen images.

The screen detection module 206 receives the image query from the mobile device 115 and detects a data screen in the image. In response to receiving the image query, the screen detection module 206 analyzes the image to find the data screens appearing in the query image by performing image matching between the query image and the dynamically constructed search database. In one embodiment, the screen detection module 206 uses a well known computer vision BoW (Bag of Words) approach to match the query image with the screen images stored in the dynamically constructed search database. For example, using a scale-invariant feature transform (SIFT) algorithm, the screen detection module extracts feature points of the query image and compares the feature points to the dynamically constructed search database. For the comparison, the feature points from the query image and an image in the dynamically constructed search database are matched based on the k-nearest neighbors (KNN) and a random sample consensus (RANSAC) algorithm is used to find a suitable number of matches for homographic matrix estimation.

In some embodiments, the image query includes a geo-tagged image (e.g., using GPS, cellular triangulation, IP address, or other location information) or a series of images (i.e., a small video clip). Since the image query includes location information, and the screen detection module 206 as part of the registration process can determine the location of each of the registered display devices, the screen detection module 206 can attempt to match only display devices that are near the participant and the mobile device, which significantly reduces the total number of k-d trees to search. In some embodiments, multiple locations (e.g., a location of a local display showing a video conference of a remote location and the location of the video conference) can be used to further limit the search as described elsewhere herein. Moreover, screen detection module 206 may store the constructed k-d trees for future queries. In some embodiments, the saved k-d trees may be discarded after a period of time, for example if the screen is updated.

In some embodiments, after feature matching, the screen detection module 206 may perform geometric verification for candidate matches with a sufficient number of matching features. Performing geometric verification includes applying one or more verification rules to a candidate match. For example, the screen detection module 206 compares the location and orientation of the matching feature vectors to confirm that the constellation of features in the original screen image conforms geometrically to the matching features in the query image. The transformation in computer vision is often called a homography and is well understood by computer vision scientists. For instance, a simple rotation or scaling of feature points between the query image and the original screen image would indicate a geometric match and could be represented by a simple 4×4 transformation.

If the screen detection module 206 detects one or more data screens existing in the query image, the screen detection module 206 notifies the data stream presentation module 204 and the user interface module 210 of the one or more matches and provides coordinates in the image of the matching data screens. In one embodiment, in response to identifying the data screen in the query image, the data stream presentation module 204 establishes a connection between the mobile device 115 and a data stream of the selected display device 107 for the data stream to be displayed on the mobile device 115. In other embodiments, the user interface engine 210 provides an indication to the participant 125 that a data screen has been detected in the image and provides an interface for selecting a matched data screen. A participant 125 can touch or use gestures as described elsewhere herein to select a data screen and switch from the query view to the data stream of the display device 107. In response to the selection, the data stream presentation module 204 establishes a connection between the mobile device 115 and a data stream of the selected display device 107. In some embodiments, instead of a data stream, as described earlier, in response to receiving a selection of the data screen, the data stream presentation module provides a link to a mobile application or web page that provides access to or additional information about the data screen presented by the display device 107.

In some embodiments, the screen detection module 206 uses a time-stamped matching approach to match a video data stream being presented on a display device 107. To facilitate this approach, the host device 101, the hosting application 109, and/or the display device 107 assigns a time-stamp $t_i$ to each screen image $S_i$ in a series of screen images. The time-stamp can be stored with the corresponding screen image, for example in the storage 243. Similarly, at the time of capture, the query module 202 assigns a time-stamp $t_q$ to a query image. In one embodiment, the time-stamp is slightly prior to the image capture time. In order for the time-stamps created from different devices (e.g., display devices, hosting devices, mobile devices, registration server, etc.) to be comparable, each device synchronizes its time using Network Time Protocol or Simple Network Time Protocol at the time of registration. NTP and SNTP are defined by the Internet Engineering Task Force. Such a time-stamp strategy ensures that for any query image with $t_q$ and the screen image with $t_i$, if the data screen appears in the query image and $t_q > t_i$, then either $S_i$ or its subsequent frames appears in the query image. Therefore, when the query image arrives, the screen detection module 206 matches the screen image with the time-stamp max $\{t_i | t_i < t_q\}$ to match with the query image. This time-stamped matching approach does not require pre-processing but finds the most appropriate screen image to match from a series of screen images stored by the participation application 123. Additionally, the time-stamped approach allows the system to correctly handle the case that multiple display devices are playing the same video content asynchronously.

The performance of this time-stamped matching approach is mainly affected by the sampling rate of capturing and storing screen images and how query images are captured. In theory, if the screen detection module 206 receives every frame being displayed on the display device 107 (i.e., the sampling rate equals to the video frame rate), the query image captured at any time by the mobile device 115 can be matched with the correct data stream using the time-stamped matching method. However, processing every frame consumes a large amount of computation cycles of a processor and significant network bandwidth. Therefore, in order to provide practical resource consumption, the screen detection module 206 receives screen images at a much lower rate than the original video frame rate. Since not every frame is added to the dynamically constructed search database, how query images are captured and time-stamped can directly affect the detection accuracy. For example, if a video is played at 30 fps while the sampling rate of the screen detection module 206 is only 2 fps, only 2 screen images (at $t_1$ and $t_{15}$) are received by the screen detection module 206. If the query module 202 captures the query image immediately after the user initiates the request (i.e., pushes the button to capture the image), referred to herein as an "on-click" query, the query module 202 may capture the query image at, and give the image a timestamp $t_q$ close to, $t_7$. Since the screen detection module 206 only has the screen images at $t_1$ and $t_{15}$, the matching may fail because the intensive motion may cause the screen images at $t_1$ and $t_{15}$ to be significantly different from query image captured at $t_7$.

To address this problem, the query module 202 implements a "sync" query that can accommodate sampling at a lower rate than the video frame rate. Depending on the maximum sampling rate, the screen detection module 206 receives a screen image at full second, half second, or quarter second intervals, or the like. The query module 202 uses this predictable timing to initiate multiple images (e.g., three images) to be captured, at the nearest quarter second, half second, full second, etc. The query module 202 bundles the images together in a single image query with the location and time-stamp data for each image and sends the query to the screen detection module 206 for matching. By taking multiple images, the query can accommodate the lower sampling rate and increase the chance of getting successful matches. For example, with the image taken at the half second point, query image has a $t_q$ close to $t_{15}$ so that it can be appropriately matched with the available screen image captured at the same time.

Minimizing the uploading bandwidth by reducing the sampling rate for each display device, allows the system to support more display devices. Additional bandwidth reduction can be achieved by downscaling the screen image for processing (e.g., to no more than 640×480), using advanced coding tools to compress screen images (e.g., H.264), and uploading only the features with low bit rate descriptors (e.g., compressed histogram of gradients (CHoG)). In one embodiment, the host device 101, the hosting application 109, and/or the display device 107 do not transmit all features of a screen image to the screen detection module 206, but only the features repeated in time-adjacent screen frames. The main idea is not to waste bandwidth on isolated features appearing only in a single screen image. The pseudo code of the proposed selection method is shown in Algorithm 1 below.

---
Algorithm 1 Pseudo code of selecting repeated features
---
```
1:  while true do
2:    S = copy_screen( );
3:    curr_feat = feat_detect(S);
```

---
Algorithm 1 Pseudo code of selecting repeated features
---
```
4:    good_match = feat_match(prev_feat, curr_feat);
5:    for i = 1 → good_match.size( ) do
6:      if prev_upload.contains(good_match[i]) then
7:        curr_upload.add_repeat_feat(good_match[i]);
8:      else
9:        prev_upload.add_feat(good_match[i]);
10:       curr_upload.add_repeat_feat(good_match[i]);
11:     end if
12:   end for
13:   upload_to_server(prev_upload);
14:   prev_feat = curr_feat;
15:   prev_upload = curr_upload;
16: end while
```

The view switching module 208 includes software and/or logic to switch a view on a mobile device 115 between a query view and a data stream or other content. In some embodiments, the view switching module 208 may be implemented using a combination of hardware and software executable by processor 235. In other embodiments, the view switching module 208 is a set of instructions executable by the processor 235. In some implementations, the view switching module 208 is instructions stored in the memory 237 and is accessible and executable by the processor 235. In some implementations, the view switching module 208 is adapted for cooperation and communication with the processor 235, the memory 237 and other components of the computing system 200 via the bus 220.

In one embodiment, if the participant 125 performs a natural gesture (e.g., a pinch open, a tap or double tap gesture, etc.) within a highlighted matching area or a link associated with a data screen on a touch screen of the mobile device 115, the view switching module 208 interprets the participant's natural gesture as a command to switch from the query view to the data stream view. The view switching module 208 generates a view switching signal describing the command and sends the view switching signal to the data stream presentation module 204 to present the data stream view to the participant 125.

In the data stream view mode, if a secondary data stream is associated with the presented data stream and visible in the data stream, the participant 125 can use a natural gesture on the secondary data stream. The view switching module 208 interprets the natural gesture as a command to switch from the data stream view to the secondary data view. The view switching module 208 generates a view switching signal describing the command and sends the view switching signal to the view presentation module 204 to present the secondary data stream to the participant 125 in full resolution.

The user interface module 210 includes software and/or logic to generate graphical data for providing a user interface. In some embodiments, the user interface module 210 may be implemented using a combination of hardware and software executable by processor 235. In other embodiments, the user interface module 210 is a set of instructions executable by the processor 235. In some implementations, the user interface module 210 is instructions stored in the memory 237 and is accessible and executable by the processor 235. In some implementations, the user interface module 210 is adapted for cooperation and communication with the processor 235, the memory 237 and other components of the computing system 200 via the bus 220.

In one embodiment, the user interface module 210 receives instructions from the data stream presentation module 204 to generate graphical data for providing a user interface to a user such as a host 135 or a participant 125. The user interface module 210 sends the graphical data to the hosting device 101 or the mobile device 115, causing the hosting device 101 or the mobile device 115 to present the user interface to the user. For example, the user interface module 210 generates graphical data for providing a user interface that depicts a query view or a data stream. The user interface module 210 sends the graphical data to the mobile device 115, causing the mobile device 115 to present the query view or the data stream to the participant 125 via the user interface. In other embodiments, the user interface module 210 may generate graphical data for providing other user interfaces to users.

An example use of the system described herein includes a retrieval application for retrieving information relevant to an image. For example, a user can capture an image of an advertisement (e.g., an advertisement for a vehicle brand), and instruct the retrieval application to retrieve information relevant to the advertisement. The image of the advertisement may include a banner and/or a data screen image showing a commercial video. The retrieval application can instruct the screen detection module 206 to detect the data screen in the image of the advertisement and to identify a product that matches content shown in the data screen image. The retrieval application may retrieve information relevant to the identified product from one or more databases and provide the relevant information to a user. Other example uses of the system described herein are possible.

Figure 3:
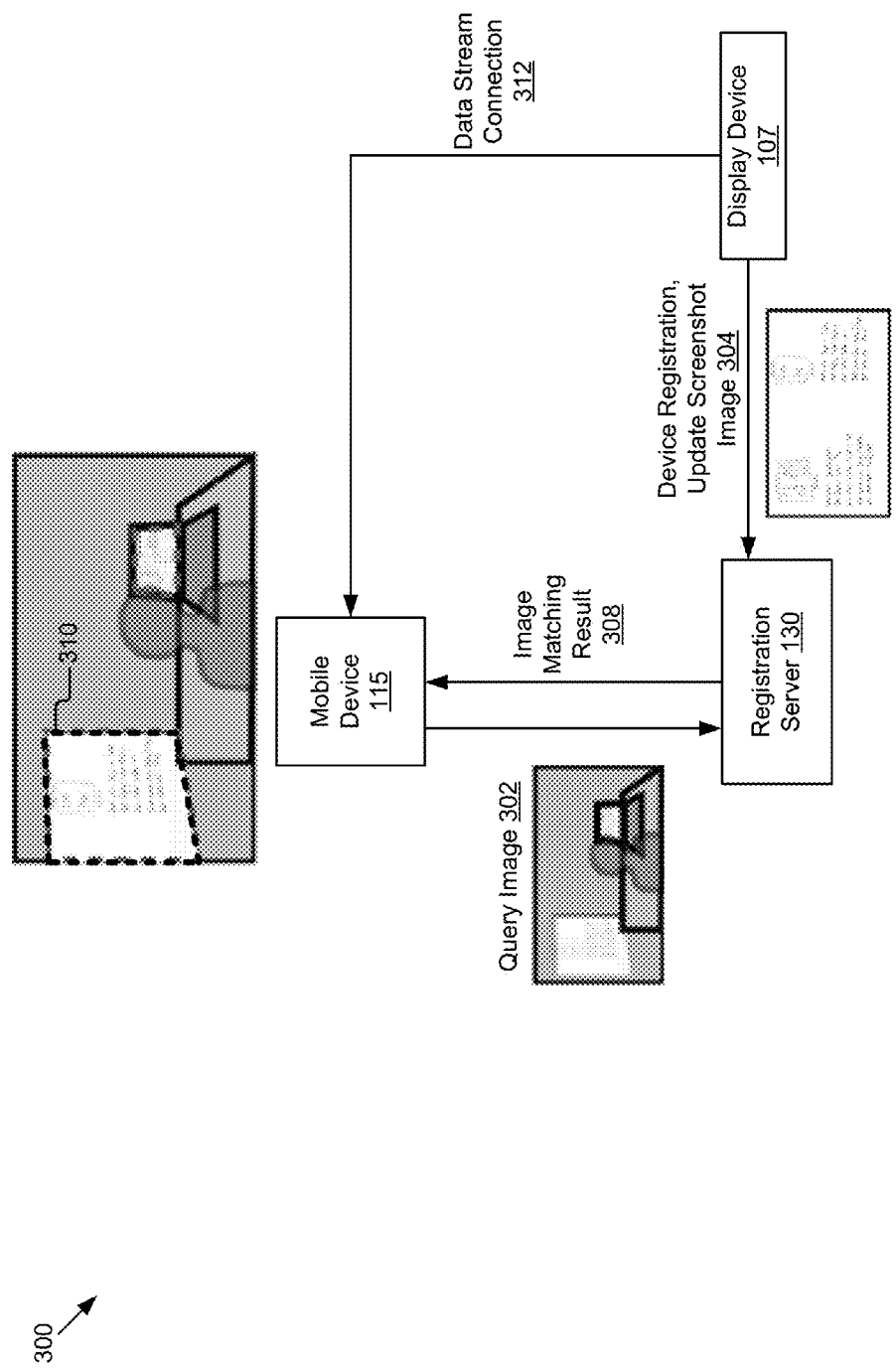
FIG. 3 is a graphic representation illustrating one embodiment of a process for performing data screen detection.

FIG. 3 is a graphic representation 300 illustrating one embodiment of a process for performing data screen detection. The display device 107 registers with the registration server 130 and sends a series if screen images 304 of a data screen associated with the display device 107 to the registration server 130. In the illustrated example, the display device 107 is an electronic whiteboard but can be any display device (e.g., a projector, video screen, etc.). The participant 125 captures a query image 302 using a mobile device 115. The query image 302 is transmitted to the registration server 130. The registration server 130 uses an image-matching method as described above to detect active data screens dynamically. For example, the registration server 130 uses an image matching algorithm to find the correspondence between the query image 302 and a screen image received from the display device 107. If a matching result 308 between the query image and a screen image received from the display device 107 is found, the registration server 130 notifies the mobile device 115 of the matching result 308 and the mobile device 115 highlights the corresponding data screen in the query image. For example, the mobile device 115 uses a box 310 to highlight a data screen of an electronic whiteboard in the query image. The display device 107 associated with the data screen establishes a data stream connection 312 with the mobile device 115. In response to the participant selecting to view the data stream associated with the display device 107, the display device 107 sends a data stream to the mobile device 115 via the data stream connection 312.

Figure 4A:
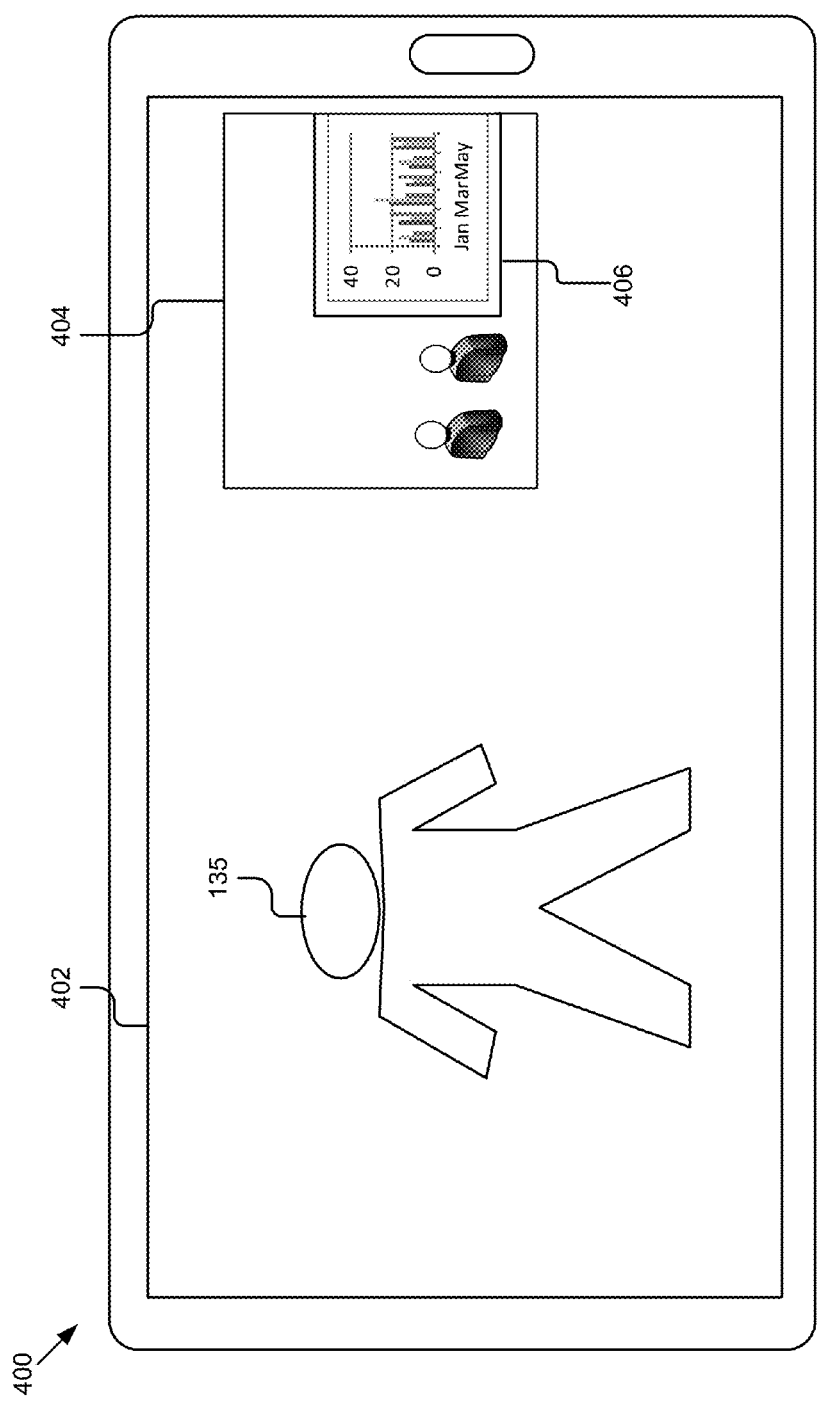
FIG. 4A is a graphic representation of one embodiment of a graphic user interface illustrating a query view mode on a mobile device.

FIG. 4A is a graphic representation 400 of one embodiment of a graphic user interface illustrating a query view on a mobile device 115. The example user interface shows a query image 402 depicting a conference room. The query image 402 depicts a host 135 and a data screen 404, identified by the screen detection module 206, of the hosting device 101 projected on a wall of the conference room. The data screen 404 includes a secondary data screen 406, also identified by the screen detection module. If the participant 125 performs a natural gesture on the data screen 404 captured in the query image 402, the mobile device 115 switches from the query view to the data stream view as shown in FIG. 4B.

Figure 4B:
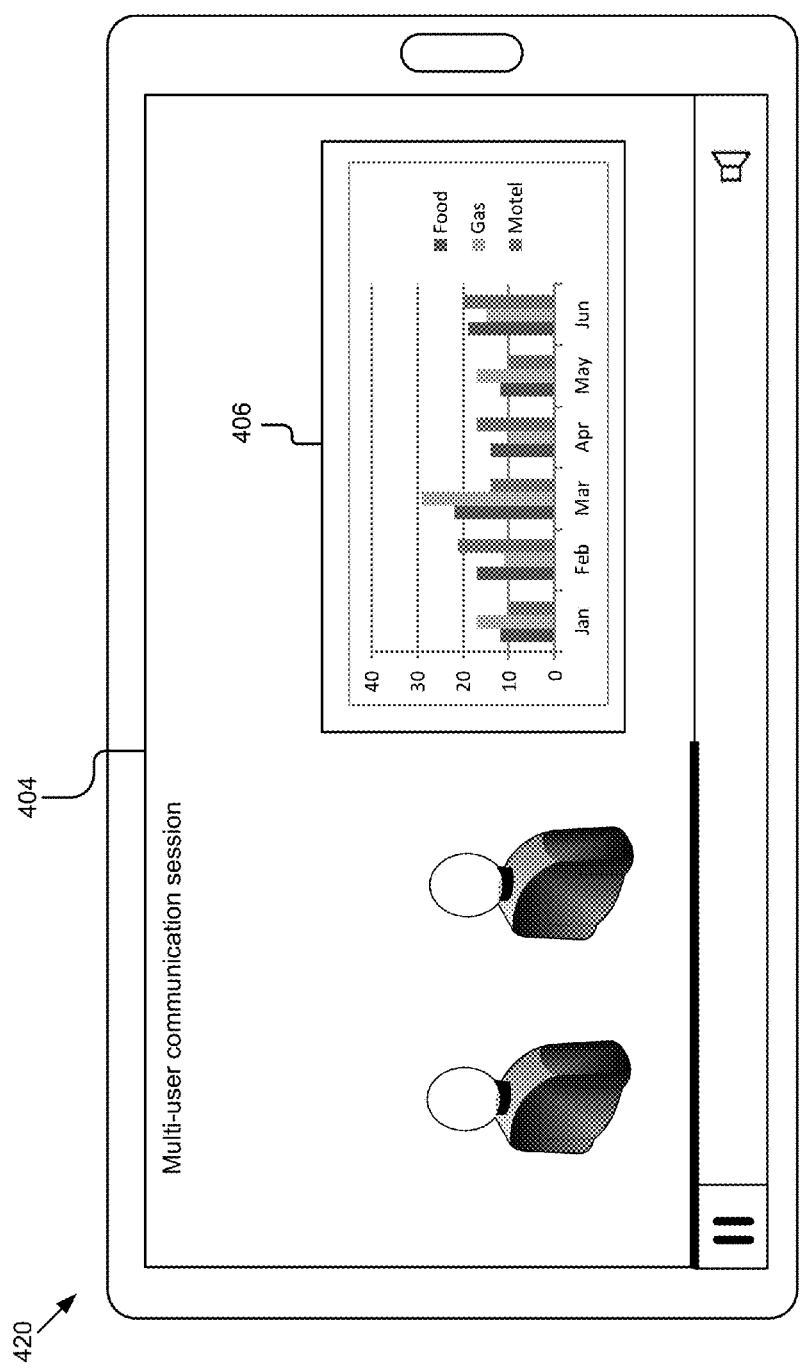
FIG. 4B is a graphic representation of one embodiment of a graphic user interface illustrating a data stream view mode on a mobile device.

FIG. 4B is a graphic representation 420 of one embodiment of a graphic user interface illustrating a data stream view on a mobile device 115. In this example, a data stream view including screenshot images of the data screen 404 is presented on the mobile device 115. The data stream is of a multi-participant meeting where a second data stream is being presented or is otherwise associated with the data stream. For example, the data stream is a video clip of another conference where slides are presented. The secondary data screen 406 presenting the slides is shown in the screenshot image of the data screen 404. In one embodiment, the participant 125 can keep zooming into the data view if the video clip includes presentation slides or whiteboard strokes information associated with the data view. For example, if the participant 125 performs a natural gesture on the secondary data screen 406, the mobile device 115 can switch from the data stream view to an secondary data view shown in FIG. 4C to present slides associated with the video clip.

Figure 4C:
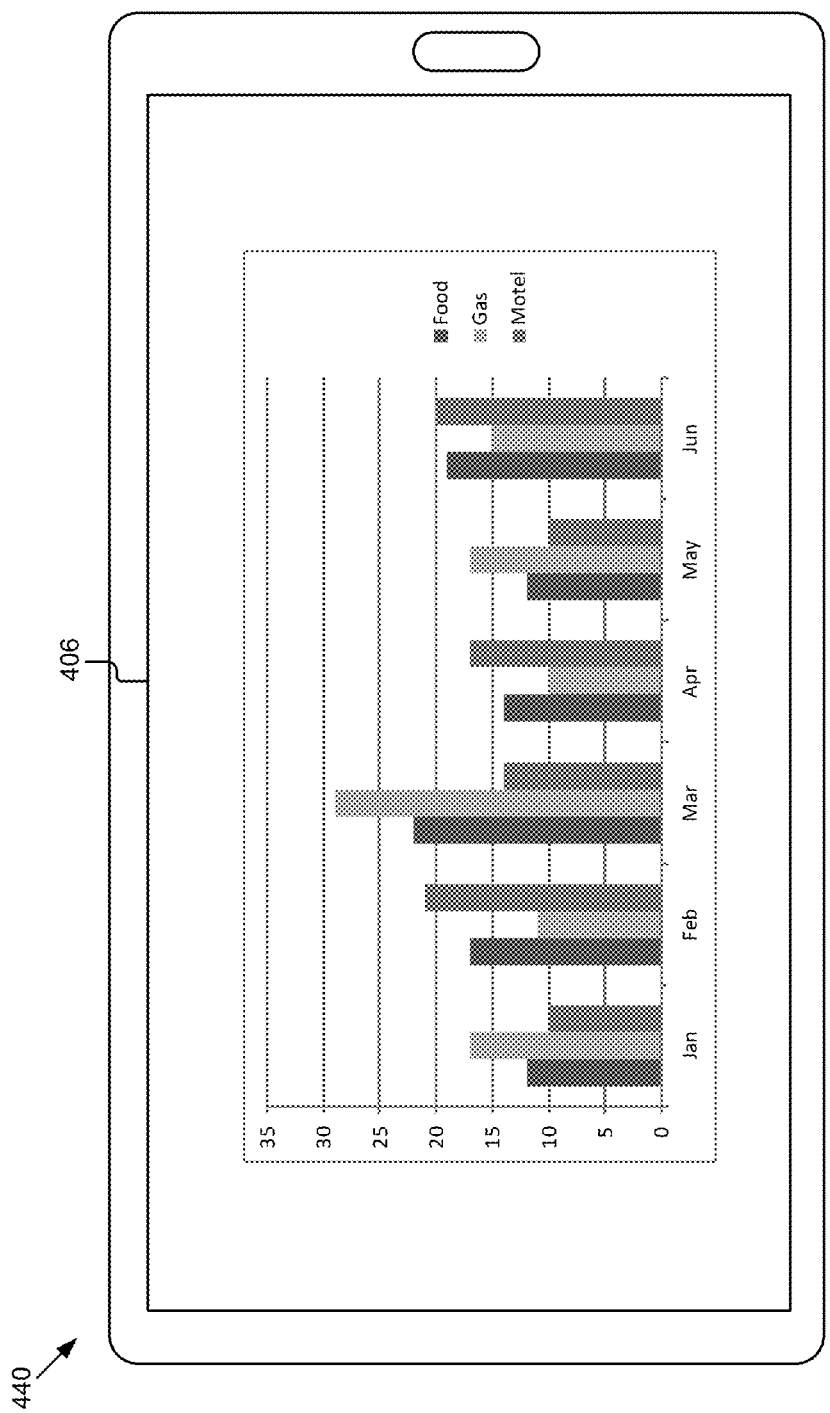
FIG. 4C is a graphic representation of one embodiment of a graphic user interface illustrating a secondary data view mode on a mobile device.

FIG. 4C is a graphic representation 440 of one embodiment of a graphic user interface illustrating a secondary data view on a mobile device 115. In this example, the slides shown in the secondary data screen 406 are presented to the participant 125. The participant 125 may exit from the secondary data view and return to the data stream view shown in FIG. 4B by performing a natural gesture (e.g., a pinch to close gesture).

Figure 5:
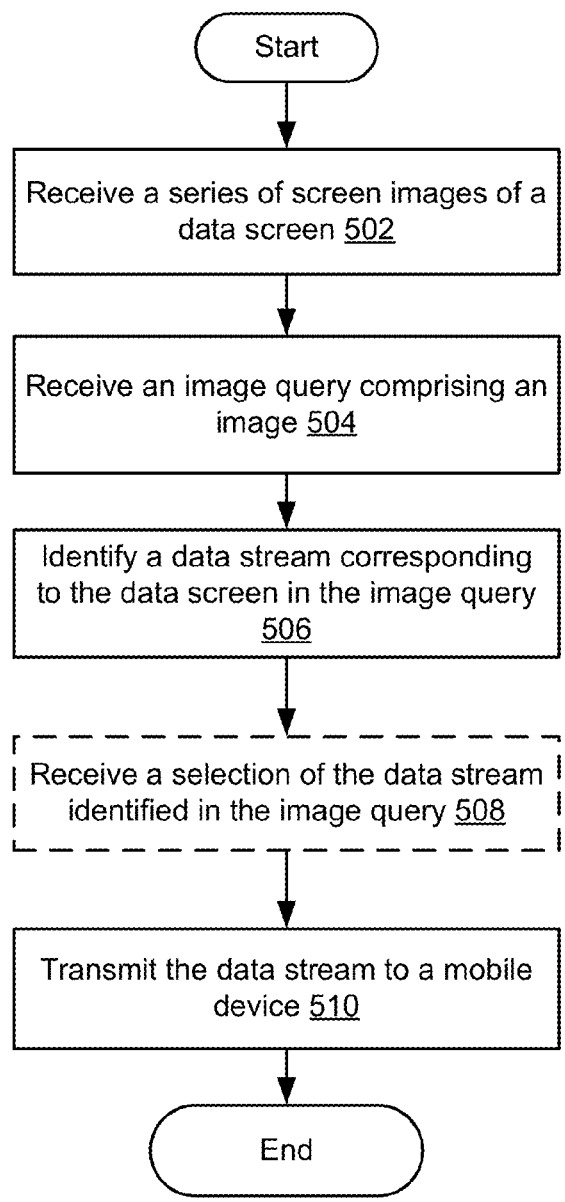
FIG. 5 is a flow diagram illustrating one embodiment of a method for detecting a data screen in a query image and presenting a data stream corresponding to the data screen for display on a mobile device.

FIG. 5 is a flow diagram illustrating one embodiment of a method 500 for detecting a data screen in a query image and presenting a data stream corresponding to the data screen for display on a mobile device. At 502, a screen detection module 206 receives a series of screen images of the data screen displayed by a display device 107. For example, as described above, the screen detection module 206 may receive the series of screen images from a host device 101, a hosting application 109, and/or the display device 107. At 504, the screen detection module 206 receives an image query comprising an image. As described in more detail above, the query module 202 may capture one or more images and send the one or more images along with location and time-stamp data to the detection module 206 as an image query. At 506, the screen detection module 206 identifies a data stream corresponding to the data screen in an image of the image query. For example, the screen detection module 206 matches features extracted from the image of the image query with features extracted from the series of screen images received at 502, as described in greater detail above.

At 508, the screen detection module 206 may optionally transmit a query response including an indication that a data stream corresponding to the data screen being displayed by the display device 107 is available for display on the mobile device 115 and receive a selection of the data stream identified in the image query. For example, the mobile device 115 may display the query image with an indication of the data screen detected in the query image. For example, the data screen may be highlighted in the query image. At 510, the data stream associated with the data screen is transmitted to the mobile device 115 for presentation to a participant 125. For example, in one embodiment, in response to identifying a data stream, the data stream presentation module 204 transmits the data stream to the mobile device 115 for display to the participant 125. In another embodiment, the data stream presentation module 204 transmits the data stream to the mobile device 115 in response to receiving a selection of the data stream.

A system and method for detecting and accessing a data stream associated with a display screen by capturing images of the display screen has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats.

Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A computer-implemented method comprising:
    receiving, at one or more processors, a data stream including a series of screen images of a data screen displayed by and captured from a display device while data is being presented;
    receiving, at the one or more processors, an image query comprising an image captured from a user device camera while the data screen is being displayed;
    extracting feature points from the image and a screen image of the series of screen images;
    building a randomized k-d tree using feature points of the screen image in the series of screen images;
    identifying, with the one or more processors, the data stream including the series of screen images of the data screen corresponding to the data screen in the image captured from the user device camera using the randomized k-d tree; and
    transmitting the data stream for presentation to a user of the user device.

2. The method of claim 1, comprising:
    registering the display device displaying the data screen; and
    associating the series of screen images of the data screen displayed by the display device with the display device.

3. The method of claim 1, wherein identifying the data stream including the series of screen images of the data screen corresponding to the data screen in the image captured from the user device camera comprises detecting a region in the image from the user device camera that matches an image in the series of screen images of the data screen.

4. The method of claim 1, wherein the image query includes location information of the user device and wherein identifying the data stream corresponding to the data screen comprises searching only for data screens near the user device.

5. The method of claim 1, comprising:
    time-stamping the image query and screen images of the series of screen images; and
    wherein identifying the data stream corresponding to the data screen further comprises:
        comparing a time stamp of the image query to time stamps of the series of screen images to identify a starting screen image with a time stamp prior to the image query; and
        identifying the data screen in the image, captured from the user device camera, from screen images after the starting screen image using the randomized k-d tree.

6. The method of claim 1, wherein the image query comprises a plurality of images from the user device camera, the plurality of images captured at intervals coordinated with receiving the series of screen images.

7. A computer program product comprising a non-transitory computer usable medium including a computer readable program, wherein the computer readable program when executed on a computer causes the computer to:
    receive a data stream including a series of screen images of a data screen displayed by and captured from a display device while data is being presented;
    receive an image query comprising an image captured from a user device camera while the data screen is being displayed;
    extract feature points from the image and a screen image of the series of screen images;
    build a randomized k-d tree using feature points of the screen image in the series of screen images;
    identify the data stream including the series of screen images of the data screen corresponding to the data screen in the image captured from the user device camera using the randomized k-d tree; and
    transmit the data stream for presentation to a user of the user device.

8. The computer program product of claim 7, wherein the computer readable program further causes the computer to:
    register the display device displaying the data screen; and
    associate the series of screen images of the data screen displayed by the display device with the display device.

9. The computer program product of claim 7, wherein to identify the data stream including the series of screen images of the data screen corresponding to the data screen in the image captured from the user device camera the computer readable program further causes the computer to detect a region in the image from the user device camera that matches an image in the series of screen images of the data screen.

10. The computer program product of claim 7, wherein the image query includes location information of the user device and wherein to identify the data stream corresponding to the data screen the computer readable program further causes the computer to search only for data screens near the user device.

11. The computer program product of claim 7, wherein the computer readable program further causes the computer to:
    time-stamp the image query and screen images of the series of screen images; and
    wherein to identify the data stream corresponding to the data screen, the computer readable program causes the computer to:
        compare a time stamp of the image query to time stamps of the series of screen images to identify a starting screen image with a time stamp prior to the image query; and
        identify the data screen in the image, captured from the user device camera, from screen images after the starting screen image using the randomized k-d tree.

12. The computer program product of claim 7, wherein the image query comprises a plurality of images from the user device camera, the plurality of images captured at intervals coordinated with receiving the series of screen images.

13. A system comprising:
    one or more hardware processors; and
    a memory storing instructions, which when executed by the one or more hardware processors cause the system to:

receive a data stream including a series of screen images of a data screen displayed by and captured from a display device while data is being presented;

receive an image query comprising an image captured from a user device camera while the data screen is being displayed;

extract feature points from the image and a screen image of the series of screen images;

build a randomized k-d tree using feature points of the screen image in the series of screen images;

identify the data stream including the series of screen images of the data screen corresponding to the data screen in the image captured from the user device camera using the randomized k-d tree; and transmit the data stream for presentation to a user of the user device.

14. The system of claim 13 wherein the instructions further cause the server to:

register the display device displaying the data screen; and associate the series of screen images of the data screen displayed by the display device with the display device.

15. The system of claim 13, wherein to identify the data stream including the series of screen images of the data screen corresponding to the data screen in the image captured from the user device camera, the instructions further cause the server to detect a region in the image from the mobile device camera that matches an image in the series of screen images of the data screen.

16. The system of claim 13, wherein the image query includes location information of the mobile device and to detect the data screen, the instructions further cause the server to search only for data screens near the user device.

17. The system of claim 13, wherein the instructions further cause the server to:

time-stamp the image query and screen images of the series of screen images; and wherein to identify the data stream corresponding to the data screen, the instructions further cause the server to:

compare a time stamp of the image query to time stamps of the series of screen images to identify a starting screen image with a time stamp prior to the image query; and identify the data screen in the image, captured from the user device camera, from screen images after the starting screen image using the randomized k-d tree.

18. The system of claim 13, wherein the image query comprises a plurality of images from the user device camera, the plurality of images captured at intervals coordinated with receiving the series of screen images.

19. The method of claim 5, further comprising matching the data screen in the image captured by the user device camera with the starting screen image or a subsequent screen image in the series of screen images.

20. The computer program product of claim 11, wherein the computer readable program further causes the computer to match the data screen in the image captured by the user device camera with the starting screen image or a subsequent screen image in the series of screen images.

* * * * *